United States Patent [19]
Storandt

[11] 3,848,577
[45] Nov. 19, 1974

[54] CHARCOAL FIRE STARTER AND GRILL

[76] Inventor: Duane L. Storandt, 12 Hanley Downs, Richmond Heights, Mo. 63117

[22] Filed: Mar. 12, 1973

[21] Appl. No.: 340,257

[52] U.S. Cl............................................. 126/25 B
[51] Int. Cl........................... A47j 37/07, F24b 3/00
[58] Field of Search ...... 126/25 B, 25 R, 25 A, 9 B, 126/59.5; 110/1 F; 16/114 R, 120; 294/27, 33; 220/92, 94, 95

[56] References Cited
UNITED STATES PATENTS

| | | | |
|---|---|---|---|
| 1,126,220 | 1/1915 | Jackson | 126/9 B |
| 2,044,388 | 6/1936 | Gundelfinger | 126/9 B |
| 2,920,614 | 1/1960 | Phelps | 126/25 B |
| 3,112,716 | 12/1963 | Knight | 110/1 F |
| 3,116,704 | 1/1964 | Byars, Sr. et al. | 126/25 B X |
| 3,167,040 | 1/1965 | Byars, Sr. et al. | 110/1 F |
| 3,481,267 | 12/1969 | Saiki | 126/25 R X |

FOREIGN PATENTS OR APPLICATIONS

| | | | |
|---|---|---|---|
| 1,015,018 | 8/1952 | France | 110/1 F |

*Primary Examiner*—William F. O'Dea
*Assistant Examiner*—Harold Joyce
*Attorney, Agent, or Firm*—Robert J. Eck

[57] ABSTRACT

A charcoal fire starter and grill incorporating an open ended tubular body which is divided by a perforate grate into a charcoal chamber and a combustion chamber; therebeing vents in the body for developing a flue effect to concentrate maximum heat intensity in the vicinity of the charcoal chamber. Detachable handles are provided for ready insertion within and removal from the body and also for supporting an auxiliary grill in usage.

4 Claims, 5 Drawing Figures

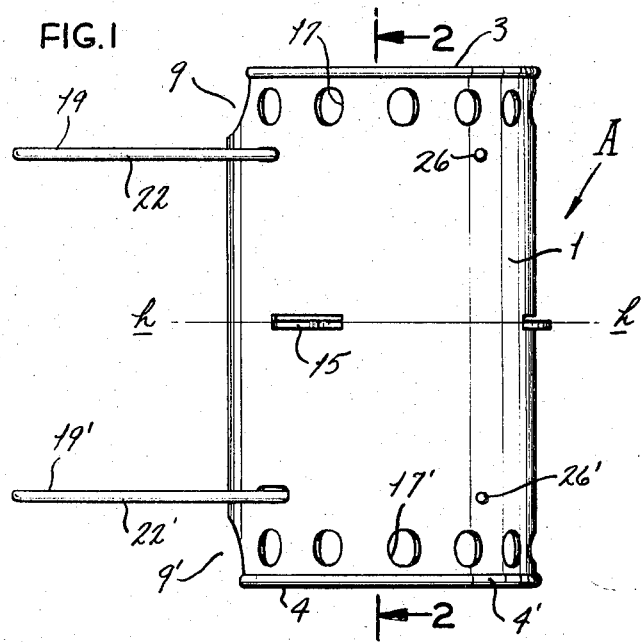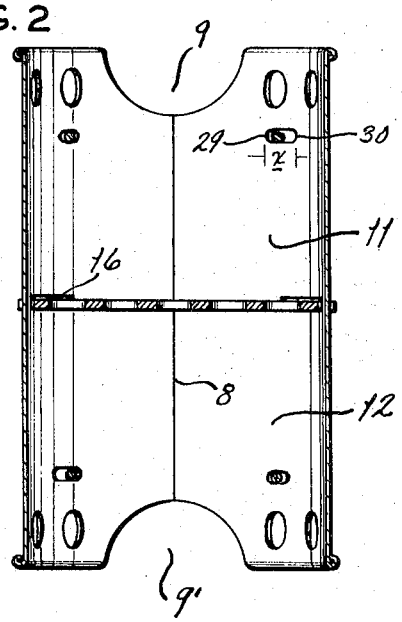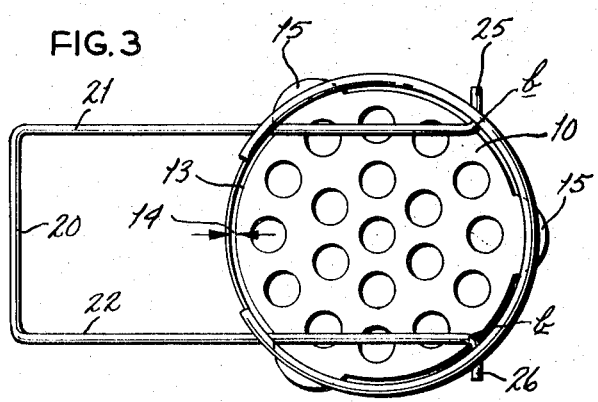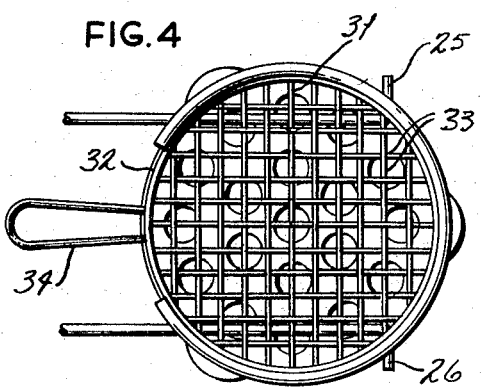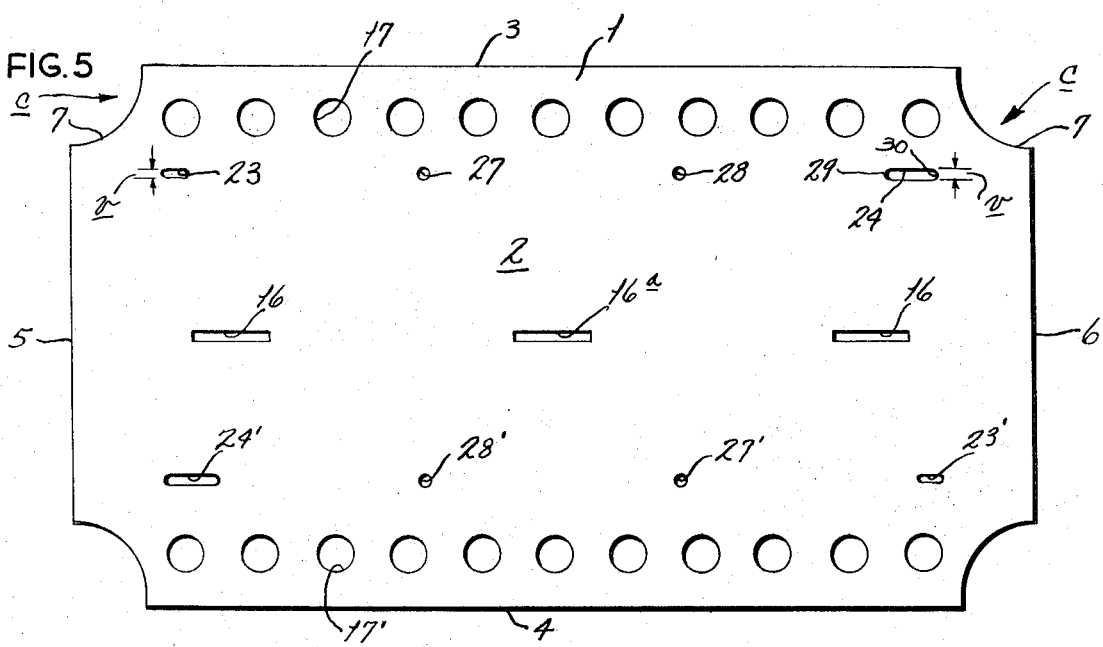

3,848,577

CHARCOAL FIRE STARTER AND GRILL

BACKGROUND AND SUMMARY OF THE INVENTION

The present invention relates in general to fuel ignition, and more particularly to a charcoal fire starter and grill.

Heretofore, various expedients have been utilized to assist charcoal ignition for outdoor barbeque cooking. The most commonly accepted practice is to saturate the briquettes with a highly inflammable liquid, referred to as starter fluid, and then to apply a lighted match thereto. Normally, the saturated charcoal would burst into flames frequently burning the operator.

Using the starter fluid required a relatively long period of time for ignition, sometimes taking 45-60 minutes, and even longer when the charcoal was wet or damp. In an effort to hasten the ignition of the charcoal, an operator sometimes would spray additional starter fluid on the hot coals generating fire flare up and/or explosions of the fluid container yielding severe burns and sometimes death. In addition to the dangerous feature of the highly inflammable fluid, the saturation of the charcoal oftentimes transferred the offensive smell and taste of the starter fluid onto the food item being prepared.

More recently, charcoal starters of the electrical type have been used. These charcoal starters also have been lacking as the charcoal ignition has been uneven and also time consuming.

The present invention comprises a tubular body having a perforated grate which divides the body into a charcoal chamber and a combustion chamber. Received within the combustion chamber is an easily available and inexpensive combustible material, such as newspaper, wood chips or the like. Upon igniting the combustible material, the tubular body is vented for developing a flue effect wherein the fire in the combustion chamber is pulled upwardly for concentrating intense heat on the charcoal placed within the charcoal chamber. Experiments have shown that, by the present invention, charcoal is ignited for barbequeing within approximately 5-10 minutes depending, of course, on the volume of charcoal. Thus, the time for charcoal ignition is substantially reduced and the danger formerly associated with the highly volatile starter fluid is eliminated.

The charcoal fire starter of the present invention is relatively simple in construction being inexpensive to manufacture but completely reliable in usage. Moreover, the charcoal fire starter incorporates novel detachable handles which may be easily inserted and removed for facile shipping and storage, but which are also sturdy and safe in usage. Once the handles are in locked position, they cannot be accidently dislodged no matter how rough the charcoal fire starter is handled in usage.

The charcoal fire starter is divided into equal volumes which are reversible wherein the charcoal chamber on one occasion may become the combustion chamber on another; and vice versa. Therefore, the life of the charcoal starter is substantially increased at least twofold.

Another advantage of the present invention is the provision of an auxiliary grill which is easily inserted within the upper chamber for support on the legs of the handle. By this feature, the charcoal fire starter is converted into a camper's grill or stove readily accommodating various food items for cooking in the outdoors.

BRIEF DESCRIPTION OF THE DRAWINGS

FIG. 1 is a side elevational view of a charcoal fire starter constructed in accordance with and embodying the present invention.

FIG. 2 is a vertical section taken on the line 2—2 of FIG. 1.

FIG. 3 is a top plan view. FIG. 4 is a fragmentary top plan view illustrating a grill in operative position.

FIG. 5 is a plan view illustrating the stamped blank of sheet material from which the charcoal fire starter is constructed.

DESCRIPTION OF THE PREFERRED EMBODIMENT

Referring now by reference characters to the drawings which illustrate the preferred embodiment of the present invention, A designates a charcoal fire starter comprising a body 1 which is fabricated from a single blank of incombustible metallic sheet material 2 (FIG. 5) having an upper edge 3, a lower edge 4 and a pair of end edges 5, 6. Said edges 3, 4, 5 and 6 meet at corner portions $c$ each of which are cut to form an arcuate margin 7.

The blank of sheet material 2 is rolled into tubular form with the end edges 5, 6 being fixed, as be welding, in overlapping relationship to define a seam 8. Upon rolling, the arcuate margins 7 of each corner portion cooperate to define upper and lower semi-arcuate recesses or cut-outs 9, 9', respectively, for purposes to be described in the operation hereinbelow. The top and bottom edges 3, 4 are crimped, as at 3', 4', to augment the strength thereof in usage.

In the plane containing the transverse axis $h—h$, the body 1 is divided by a perforated grate 10 into an upper chamber 11 and a lower chamber 12. Said grate 10 is of substantially circular configuration having a peripheral rim 13 which is of less diameter than the inside diameter of said body 1 for defining a spacing 14 there between. Formed integral with said peripheral rim 13 are a plurality of circumferentially spaced-apart lugs 15 which project radially outwardly of the peripheral rim 13 for reception within complimentary slots 16 fashioned within said body 1 to support said grate 10 in operative position. No extraneous fasteners, or the like, are required to maintain the grate 10 in permanent, operative position. The preferred embodiment utilizes three lugs 15, and corresponding slots 16, which are spaced 120° apart; it being understood that more or less lugs 15 may be employed without departing from the instant invention.

Body 1 is substantially symetrical about the transverse axis $h—h$, the upper half being the mirror image of the lower half. Therefore, the body 1 may be rotated 180 degrees so that the bottom edge 4 and the lower chamber 12 becomes the upper edge 3 and the upper chamber 11, respectively; and vice versa. Accordingly, only the upper half will be described, with like reference characters designating like elements in the lower half, to obviate unnecessary repetitive explanation.

Spacedly downwardly from the upper edge 3, the body 1 is formed with a plurality of circumferentially spaced-apart vents, as at 17, which permit the intake of air for developing a draft in operation, as will be described. Adjacent to and spacedly downwardly of vents 17, body 1 is provided with a detachable handle 19 formed of wire stock and having a web or hand grip portion 20 and a pair of elongate legs 21, 22 which pass through handle receiving slots 23, 24 in body 1. The terminal or web remote end portion of each leg 21, 22 is outwardly bent, as at $b$, to develop a lug 25, 26, respectively. Each lug 25, 26 is fitted within locking apertures 27, 28, respectively, provided within the body 1.

Both handle receiving slots 23, 24 have a vertical dimension $v$ substantially the same as the thickness of the related leg 21, 22, respectively, and a horizontal dimension greater than said vertical dimension $v$. The horizontal extent of handle receiving slot 23 is designed to accommodate the endwise entry of the lug 25 and facile turning of bend $b$ of said lug 25; whereas the horizontal extent of handle receiving slot 24 is fashioned to receive the flushwise entry of the lug 26. It will be observed that when the body 1 is in tubular form, the horizontal distance $x$ (FIG. 2) between parallel planes containing the end portions 29, 30 of handle receiving slot 24 is substantially the same dimension as the length of said lug 26.

Provided for reception within upper compartment 11 is a reticulated grill 31 comprising a peripheral rim 32 and a plurality of interlaced bars 33; there being a handle 34 formed integral with said peripheral rim 32 and projecting radially outwardly through recess 9. The outside diameter of rim 32 is slightly less than the inside diameter of body 1 thereby conducing to facile insertion and removal along with a snug fit for preventing undesirable shifting in usage. Said grill 31 is supported by the legs 21 and 22 of the handle 19 (FIG. 4) within chamber 11. Therefore, the novel handle 19 of the present invention alleviates the need for auxiliary supports, or like structure, for the grill 31.

METHOD OF CONSTRUCTION

The present invention also contemplates the method of constructing the charcoal fire starter A. Initially, the method comprises the steps of providing a grate 10 with circumferentially spaced-apart lugs 15 and a single blank of sheet material 2. Next, the blank of sheet material 2 is stamped, in a single operation, for developing the vents 17, handle receiving slots 23 and 24, locking apertures 27, 28, the grate slots 16 and the arcuate margins 7. Then grate 10 is addressed to blank 2 so that a lug 15 is inserted within the center slot 16a after which the blank of sheet material 2 is rolled with the remaining lugs 15 being received within the end slots 16 and the end edges 5, 6 of the blank of sheet material 2 being fixed. Finally, the handle 19 is introduced to body 1 so that lug 25 is passed endwise through handle receiving slot 23, turned approximately 90° to receive the bend $b$ and a portion of leg 21, whereupon lug 26 is passed flushwise through the handle receiving slot 24. Both legs 21 and 22 are urged inwardly until the lugs 25 and 26 approach the locking apertures 27, 28, respectively, whereupon the lugs 25, 26 are fitted into locked position within said locking apertures 27, 28. Handle 19' is inserted in like manner within lower chamber 12.

Accordingly, by following the method of construction, the charcoal fire starter A may be efficiently and economically produced with a minimum of material and effort.

OPERATION

In operation, the body 1 is first positioned on its upper edge 3 and combustible material, such as wood chips, newspaper or the like, is inserted within the lower chamber 12, after which the body 1 is reversed for resting on its bottom edge 4. Then charcoal, (not shown) such as the briquettes, is introduced into the upper compartment 11 being supported on grate 10. The operator than ignites the combustible material contained in the lower chamber 12, as by inserting a lighted match through the recess 9'. The combustion of newspaper and/or wood chips creates an intense heat in the region immediately adjacent the grate 10, the combustion of the newspaper and/or wood chips being aided by the draft created by the intake of air through vents 17', which air moves upwardly through the perforated grate 10 and the spacing 14 thereof to pull the fire upwardly for igniting the charcoal. If additional newspaper or wood ships are required, they may be easily inserted within the lower chamber 12 by insertion through recess 9'. The intense heat developed in the lower chamber 12 ignites the charcoal in the upper chamber 11 in a relatively short period of time. After the charcoal is ignited to satisfaction, the operator may grasp the hand grips 20, 20' of both handles 19, 19' and dump the ignited charcoal into a brazier, or the like, for outdoor barbequeing.

An additional feature of the present invention is the provision of the auxiliary grill 31 which may be easily inserted within the upper chamber 11 being supported on the legs 21 and 22 of handle 19 (FIG. 4). In operative position, food items, such as frankfurters, hamburgers, chops or small steaks, may be placed on thr grill for ready cooking.

Having described my invention, what I claim and desire to obtain by Letters Patent is:

1. A charcoal fire starter comprising:
    An open-ended body;
    A grate carried by said body;
    Said grate separating said body into a charcoal chamber and a combustible material chamber;
    Handle means detachably engaged to said body comprising a substantially U-shaped handle having a hand grip portion and a pair of legs;
    Each leg having a terminal portion remote from said hand grip portion;
    Each terminal portion having a bend turning away from each other in the plane containing said legs to define an outwardly projecting lug;
    Each leg having a first portion located exteriorly of said body and a second portion presented interiorly of said body;
    Said body having handle receiving slots for accommodating the legs of said handle;
    Said body having locking apertures for receiving the lugs of said leg terminal portion;
    Said handle being of rod stock having a diameter;
    Each handle receiving slot having a height substantially the same as the diameter of said leg;
    One of said handle receiving slots having a length slightly greater than the diameter of said leg to accommodate endwise entry of one lug and the related bend;

The other of said handle receiving slots having end portions, the distance between parallel planes containing the end portions being substantially the same as the length of the associated lug to permit lengthwise entry of same.

2. A charcoal fire starter comprising:

A body having open ends;

A grate carried by said body;

Said grate separating said body into a charcoal chamber and a combustible material chamber;

A pair of handle members engaged to said body in parallel, spaced-apart relationship, each handle member being located in the region adjacent the related open end of said body in substantially the same spacial relationship to said grate;

Each handle means comprising a substantially U-shaped handle having a hand grip portion and a pair of legs;

Each leg having a terminal portion remote from said hand grip portion;

Each terminal portion having a bend turning away from each other in the plane containing said legs to define an outwardly projecting lug;

Each leg having a first portion located exteriorly of said body and a second portion presented interiorly of and passing through the related chamber of said body;

Said body having handle receiving slots for accommodating the legs of said handle member;

Said body having locking apertures for receiving the lugs of said leg terminal portion.

3. A charcoal fire starter as defined in claim 2 and further characterized by:

A grill adapted for reception within said charcoal chamber of said body;

The second portion of each leg presented interiorly of the charcoal chamber constituting a support for said grill.

4. A method for constructing a charcoal fire starter comprising the steps of:

Providing a single blank of sheet material;

Stamping the blank to form handle receiving slots, locking apertures and grate slots;

Providing a grate with circumferentially spaced apart lugs;

Rolling said blank into cylindrical form with the lugs of said grate being received within grate lug slots;

Joining the end edges of said rolled blank;

Providing a handle having a pair of legs and a lug bent outwardly of each leg;

Inserting the lug of one handle leg endwise through a handle receiving slot and then turning some 90°;

Passing the lug of the other handle leg lengthwise through the other handle receiving slot and then pushing the handle within said body; and Fitting the handle lugs within said locking apertures.

* * * * *